INVENTORS
Peter Knapp
Dieter Wallstein
BY
Pierce, Scheffler & Parker
Attorneys

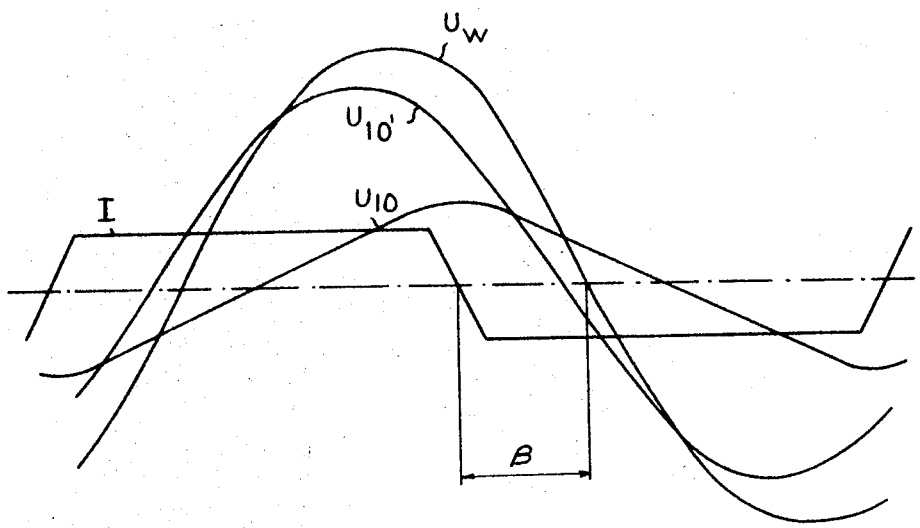

United States Patent Office 3,462,672
Patented Aug. 19, 1969

3,462,672
LOAD CONTROLLED OSCILLATORY CIRCUIT INVERTER
Peter Knapp, Nussbaumen, Switzerland, and Dieter Wallstein, Waldshut, Germany, assignors to Aktiengesellschaft Brown, Boveri & Cie, Baden, Switzerland, a joint-stock company
Filed Aug. 17, 1967, Ser. No. 661,373
Claims priority, application Switzerland, Sept. 22, 1966, 13,693/66
Int. Cl. H02m 7/44, 7/68
U.S. Cl. 321—43                 3 Claims

ABSTRACT OF THE DISCLOSURE

A load-controlled oscillatory-circuit inverter comprises controllable rectifier elements connected to a source of direct current for producing an alternating current in accordance with control pulses delivered to the rectifiers, and these control pulses are obtained from an oscillatory load circuit fed by the inverter. The load circuit which inherently includes inductance and resistance components is made to oscillate by incorporation of a capacitative quadripole between the inverter output terminals and the load and at least a part of this quadripole serves as the capacitance component of the oscillatory circuit.

The quadripole can consist of two capacitors of which one is connected in parallel with the load and is a component of the oscillatory circuit and the other is connected in series with the oscillatory circuit. In this embodiment, the parallel capacitance can be formed of two capacitors in series and a change-over switch is provided to connect one terminal of the inverter either to the junction point of these two capacitors, or to the inverter side of the capacitor connected in series with the oscillatory circuit.

The quadripole can also consist of two capacitors of which one is connected in parallel with the inverter and the other is connected in series with the load. In this embodiment, a change-over switch is arranged to connect one pole of the parallel capacitor to either the load side or to the inverter side of the capacitor connected in series with the load.

---

This invention relates to an improvement in a load-controlled oscillatory-circuit inverter with a load consisting of an inductance and an ohmic resistance which, together with a capacitance, forms an oscillatory-circuit.

Load-controlled inverters are inverters in which the frequency is determined by the inductance in the loading together with a capacitance. The capacitor used also serves for the forced commutation of the rectifier elements of the inverter. Such circuits are described in the book by Schilling entitled, "Die Wechselrichter und Umrichter."

The present invention provides a load-controlled oscillatory-circuit inverter with a load consisting of an inductance and an ohmic resistance which load together with a capacitance forms an oscillatory circuit wherein a capacitative quadripole is connected between the inverter terminals and the load connections, all or a part of the quadripole constituting the said capacitance.

The invention will be further described with reference to the accompanying drawings, in which:

FIGURE 6 illustrates graphically the operation of the circuit of FIGURE 2.

Figure 1:
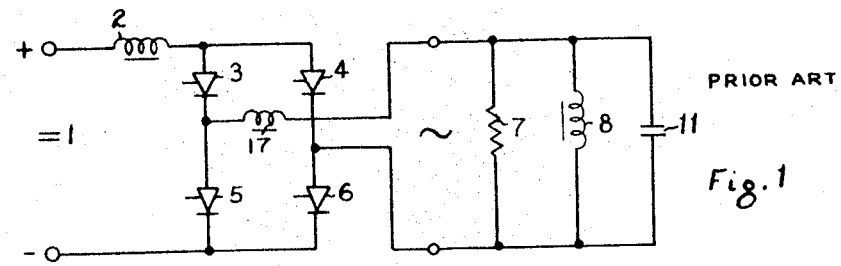
FIGURE 1 shows a circuit diagram of a previously known inverter in which the output frequency is determined by an ascillatory circuit incorporating the load.
Figure 2:
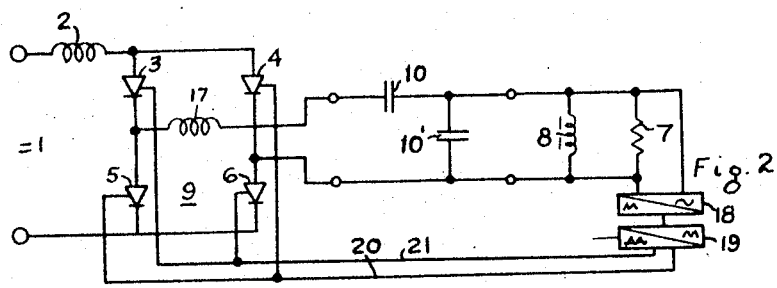
FIGURES 2 to 5 illustrate different circuits embodying the invention.

With reference now to the drawings, FIGURE 1 shows a bridge inverter composed of controlled rectifiers 3 to 6 fed from a D.C. source 1 through a smoothing choke 2. If semiconductor rectifiers are used, a choke 17 is provided in the output circuit to limit the current surges when the rectifiers are triggered. The control arrangement is not shown in this view but is, however, illustrated in FIG. 2. If the rectifiers 3 and 6 are triggered by the control arrangement, the output current flows in one direction; if the rectifiers 4 and 5 are triggered, the output current flows in the other direction, so that an alternating output current is produced. The frequency of this alternating current is determined by the control. In load-controlled oscillatory-circuit inverters, a capacitance is added to the load circuit to form an oscillatory-circuit and the frequency thereof is fed back to the control arrangement in a known way as shown in FIG. 2 for triggering the rectifiers. The oscillatory-circuit consists of the ohmic resistance 7, the inductance 8, and the capacitance 11; the inductance can be the inductance present in the load, for example, in motors or in induction furnaces.

Particularly at higher frequencies (medium frequency current converters) the necessary commutation inductance (17) brings disadvantages, because the operating range of the arrangement is restricted by them. Commutation inductances are so dimensioned that, at the highest operating voltage, the permissible speed of current rise during commutation is not exceeded. At a small operating voltage and large current, however, the commutation time is thereby undesirably greatly increased. In medium-frequency inverters, therefore, with heavy currents the required free time, i.e. the time between the extinction of the rectifiers until the renewed application of a positive voltage between anode and cathode, can no longer be kept to. This leads to undesired arc-through.

For the avoidance of this disadvantage, it is now proposed according to the invention that a capacitative quadripole be connected between the inverter terminals and the load-connections.

This capacitative quadripole can be connected in various ways.

In FIGURE 2, the inverter 9 is connected for example, as shown in FIGURE 1, between the D.C. and A.C. terminals. The load again comprises an ohmic component 7 and an inductive component 8. Instead of the single capacitor 11, a quadripole consisting of capacitors 10 and 10′ in T-connection is interposed in the circuit between the inverter output terminals and the load. Capacitor 10 lies in series with the load, capacitor 10′ in parallel, and capacitor 10′ is consequently the oscillatory circuit capacitor. By means of this connection, it is possible to expand the operating range of the arrangement with respect to the previously known arrangement as exemplified by the circuit of FIGURE 1 and to load the rectifiers evenly over the whole operating range.

This may be explained more precisely by means of FIGURE 6. The current at the inverter output is designated I. It has a trapezoidal form which arises due to the smoothing effect of the inductance 2 on the D.C. side in advance of the inverter 9. This current flows through the capacitor 10 and generates in it an approximately triangular voltage $U_{10}$. The level of this voltage is only dependent on the capacitance of the capacitor 10, the level of the current I, and the frequency. The voltage $U_{10}$, arising in the oscillatory-circuit 7, 8, 10′ is sinusoidal. On this is superposed the voltage $U_{10}$. At the output of the inverter, there is then the voltage $U_W$ arising from the superposition. This voltage, at the instant of commutation, lies above the value which would be given by the previously known circuit.

The utilization of the valves is consequently hardly affected. The voltage $U_W$ is phase-displaced the angle $\beta$ relative to the current I. The voltage $U_W$ is now the commutation voltage. Since this has now become higher, the overlapping time is smaller so that the operating range can be increased. The phase-displacement between the voltages $U_W$ and $U_{10}$, is dependent on load, since it depends on the voltage $U_{10}$ generated by the load current. In the derivation of the inverter control pulses from the voltage $U_{10}$, the free time of the rectifier elements remains approximately constant because the current-dependent increase of the commutation time, in itself small in this circuit, is balanced by a current-dependent distortion of the voltage $U_W$ as against $U_{10'}$.

Figure 3:
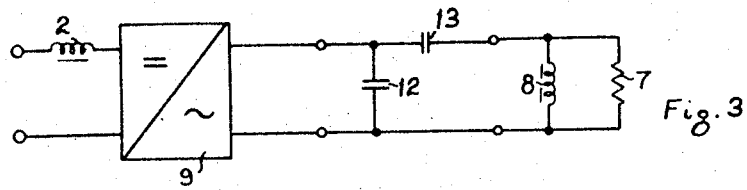

In the circuit according to FIGURE 3, a further advantage is obtained. In this circuit the series-connection of the capacitors 12 and 13 forms the oscillatory-circuit capacitance. The oscillatory-circuit voltage is in this case greater than the voltage at the capacitor 12. This thus acts as a commutation voltage. In addition, the voltage at the load 7, 8, which, of course, is equal to the oscillatory-circuit voltage, must be greater than the voltage of the inverter which is equal to the voltage at the capacitor 12. From this circuit a voltage-increase at the load can thus be obtained and thereby, if need be, additional transformers avoided.

If the capacitances 12 and 13 are made variable, the load circuit can be matched in any desired way to the voltage existing at the inverter output and the same inverter used for various load voltages.

Figure 4:
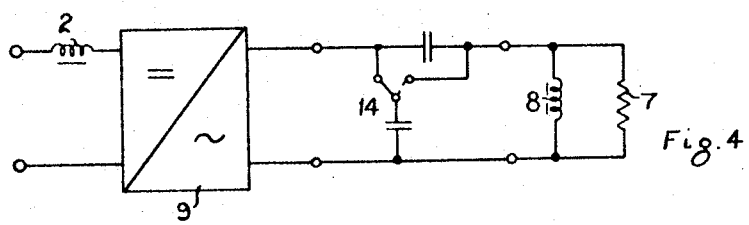

According to which circuit is convenient, a change-over from the circuit of FIGURE 2 to the circuit of FIGURE 3 can be carried out. For this purpose the change-over switch 14 shown in FIGURE 4 is provided.

Figure 5:
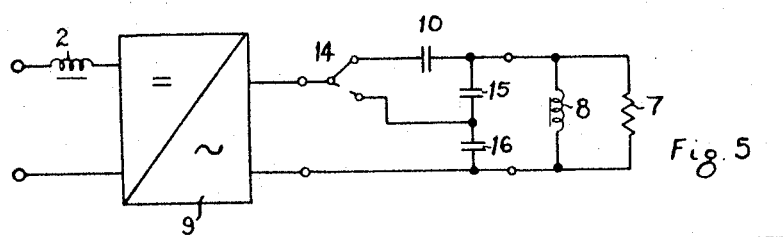

In FIGURE 5 a circuit is shown which can be convenient when starting the arrangement. In the position there shown of the change-over switch 14, capacitors corresponding to FIGURE 2 are connected, the capacitors 15 and 16 in series corresponding to the capacitor 10' of FIGURE 2. The voltage at the inverter is then higher than at the load. If the change-over switch 14 is now switched over to its other position, then only the capacitors 15 and 16 are in operation in a connection corresponding to that of capacitors 13 and 12 of FIGURE 3. Capacitors 15 and 16 still form the oscillatory-circuit capacitance but the load voltage is now higher than the inverter voltage. Thus, one can start with a small load voltage and continue operation with a higher load voltage.

The inverter elements are controlled, as indicated in FIG. 2 by the voltage in the oscillatory circuit. This is achieved by taking the voltage from the load and supplying it to element 18 where the sinusoidal voltage is converted into a triangular voltage. A direct voltage is superposed in element 19 on the triangular voltage. When the direct voltage attains the same height as the triangular voltage, a pulse occurs along conductors 20 and 21. Pulse 20 passes to elements 4 and 5 and pulse 21 to elements 3 and 6.

We claim:

1. A load-controlled thyristor parallel-resonance inverter wherein said load includes inductance and ohmic components, and a capacitative quadripole connected between the output terminals of said inverter and said load, said quadripole including at least one capacitor connected in series with one side of the inverter output and at least one capacitor connected in parallel with the inverter output, the output reactance of said quadripole operating as an oscillatory circuit capacitance and the input reactance of said quadripole operating as commutating capacitance of the inverter.

2. An inverter as defined in claim 1 and which includes a series arrangement of two capacitors connected in parallel with the inverter output, and which further includes a change-over switch arranged to connect one output terminal of said inverter either to a junction point between said two capacitors or to the inverter side of the capacitor connected in series with the inverter output.

3. An inverter as defined in claim 1 and which further includes a change-over switch arranged to connected one pole of said paralleled connected capacitor to either the load side or the inverter side of said series connected capacitor.

References Cited

UNITED STATES PATENTS

| | | | |
|---|---|---|---|
| 3,412,315 | 11/1968 | Hehenkamp | 321—43 XR |
| 3,146,406 | 8/1964 | Wilting | 331—113 |
| 3,254,292 | 5/1966 | Shuiti Ohata | 321—45 |
| 3,295,044 | 12/1966 | Pledger et al. | 321—18 XR |
| 3,315,146 | 4/1967 | Paice | 321—45 |
| 3,316,476 | 4/1967 | Olson et al. | 321—45 |
| 3,334,292 | 8/1967 | King et al. | 321—45 |
| 3,358,209 | 12/1967 | Kanngiesser | 321—45 XR |

JOHN F. COUCH, Primary Examiner

W. M. SHOOP, JR., Assistant Examiner